US009423561B1

(12) United States Patent
Chou et al.

(10) Patent No.: US 9,423,561 B1
(45) Date of Patent: Aug. 23, 2016

(54) METHOD OF ATTACHING FIBER BLOCK TO SILICON PHOTONICS

(71) Applicant: INPHI CORPORATION, Santa Clara, CA (US)

(72) Inventors: Hsu-Feng Chou, Pasadena, CA (US); Masaki Kato, Palo Alto, CA (US); Radhakrishnan L. Nagarajan, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 14/745,211

(22) Filed: Jun. 19, 2015

(51) Int. Cl.
G02B 6/26 (2006.01)
G02B 6/12 (2006.01)

(52) U.S. Cl.
CPC .................... *G02B 6/12009* (2013.01)

(58) Field of Classification Search
None
See application file for complete search history.

(56) References Cited

U.S. PATENT DOCUMENTS

| | | | | |
|---|---|---|---|---|
| 6,215,945 B1 * | 4/2001 | Fukuyama | ........... | G02B 6/3839 385/137 |
| 6,241,399 B1 * | 6/2001 | Nobuhara | ................ | G02B 6/30 385/81 |
| 7,603,021 B2 * | 10/2009 | Watanabe | ................ | G02B 6/30 385/137 |
| 2002/0097974 A1 * | 7/2002 | Matsumoto | .......... | G02B 6/3636 385/137 |
| 2003/0021573 A1 * | 1/2003 | Matsumoto | .......... | G02B 6/3636 385/137 |
| 2003/0142922 A1 * | 7/2003 | Dallas | ....................... | G02B 6/30 385/83 |
| 2004/0081403 A1 * | 4/2004 | Kim | ........................ | G02B 6/30 385/49 |
| 2006/0291782 A1 * | 12/2006 | Carpenter | ................ | G02B 6/30 385/49 |
| 2010/0310214 A1 * | 12/2010 | Miyadera | ............. | G02B 6/3636 385/91 |
| 2013/0051726 A1 * | 2/2013 | Wagener | ................... | G02B 6/32 385/18 |
| 2013/0209027 A1 * | 8/2013 | Yu | ............................ | G02B 6/12 385/14 |
| 2015/0093070 A1 * | 4/2015 | Sugama | .................. | G02B 6/30 385/14 |

* cited by examiner

*Primary Examiner* — Sung Pak
(74) *Attorney, Agent, or Firm* — Richard T. Ogawa; Ogawa P.C.

(57) ABSTRACT

An apparatus to attach a fiber block to a silicon waveguide. The apparatus includes a holder base holding a portion of an array of optical fibers aligned optically in multiple slots in parallel. The apparatus further includes a holder cap combined with the holder base for fixing the portion of the fibers and leaving the fibers free with arbitrary length beyond a first edge of the holder base but keeping only additional second length of the fibers beyond a second edge of the holder base with fiber ending facets at the second length. Additionally, the apparatus includes a silicon photonics waveguide chip including an attachment section connected to a waveguide section. The attachment section includes multiple grooves laid in parallel for respectively attaching with the second length of the fibers so that the fiber ending facets are coupled to multiple waveguides formed in parallel in the waveguide section.

25 Claims, 6 Drawing Sheets

METHOD OF ATTACHING FIBER BLOCK TO SILICON PHOTONICS

CROSS-REFERENCE TO RELATED APPLICATIONS

None.

BACKGROUND OF THE INVENTION

The present invention relates to photonics techniques. More particularly, the present invention provides methods and structures for attaching optical fiber block to silicon photonics.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

High data rates over 40-Gbit/s or 100-Gbit/s signal transmission through single-mode fiber is a target for the next generation of fiber-optic communication networks in which plenty of applications involve high speed silicon photonics devices. Many of such silicon photonics devices need to properly attach fairly large sized optical fibers to much smaller sized silicon chips. When a group of fibers is to attach a silicon photonics device, yet many problems are associated with variations in fiber end polish qualities, fiber core alignment, and process handling of multiple fibers together. Therefore, improved techniques and structures for attaching a fiber block containing multiple fibers to silicon photonics are desired.

BRIEF SUMMARY OF THE INVENTION

The present invention relates to photonics techniques. More particularly, the present invention provides improved methods and structures for attaching optical fiber block to silicon photonics. In an embodiment, the invention is applied to have a fiber array with multiple aligned polarization maintaining fibers attached to corresponding waveguides in a silicon photonics chip.

In modern electrical interconnect systems, high-speed serial links have replaced parallel data buses as interconnect quickly moves beyond 10 Gbps per lane, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law. With more and more system ports using optical interconnects through CMOS photonics waveguides, the fiber-to-silicon attachment becomes one of crucial process step for the advantage of CMOS technology to be effectively taken into the high speed data communication systems.

In an embodiment, the present invention provides an apparatus to attach a fiber block to a silicon photonics waveguide chip. The apparatus includes an array of optical fibers of arbitrary length and a holder base of a first length including multiple slots in parallel respectively holding partially a portion of the array of optical fibers. Each fiber is aligned optically within corresponding slot. Additionally, the apparatus includes a holder cap of the first length configured to combine with the holder base for fixing the portion of the array of optical fibers and leaving arbitrary length of the array of optical fibers free beyond a first edge of the holder base but keeping only additional second length of the array of optical fibers free beyond a second edge of the holder base with all fiber ending facets substantially level at the second length. The second edge opposes to the first edge across the holder base. Furthermore, the apparatus includes a silicon photonics waveguide chip including an attachment section connected to a waveguide section. The attachment section includes multiple grooves of a third length in parallel respectively aligned to multiple waveguides formed in parallel in the waveguide section. The multiple grooves are configured to respectively hold partially the second length of the array of optical fibers with each fiber ending facet being coupled to corresponding one of the multiple waveguides. Moreover, the apparatus includes a lid member disposed over the attachment section to cover and fix at least partially the second length of array of optical fibers held in the multiple grooves.

In an alternative embodiment, the present invention provides a structure for attaching a fiber block to a silicon photonics waveguide chip. The structure includes a holder base of a first length including multiple slots in parallel respectively for holding partially a finite portion of the an array of optical fibers of arbitrary length. Each of the array of optical fibers is aligned optically within the corresponding slot. Additionally, the structure includes a holder cap including a first part of the first length combined with the holder base for fixing the finite portion of the array of optical fibers. Further the holder cap includes a second part of a second length naturally extended from the first part for partially holding additional second length of the array of optical fibers with corresponding fiber ending facets being leveled with an edge of the second part of the holder cap. The array of optical fibers of arbitrary length is left free beyond opposite edge of the holder cap. Moreover, the structure includes a silicon photonics waveguide chip including an attachment section connected to a waveguide section. The attachment section of a third length includes multiple grooves in parallel respectively aligning to multiple waveguides formed in the waveguide section. The attachment section is configured to contact the second part of the holder cap so as to engage the multiple grooves respectively with the second length of array of optical fibers partially held in the second part with each the fiber ending facet being coupled to one of the multiple waveguides.

The present invention achieves these benefits and others in the context of known waveguide laser modulation technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 1 is a simplified top view of an array of fibers disposed on a holder base according to an embodiment of the present invention;

DETAILED DESCRIPTION OF THE INVENTION

Figure 1:
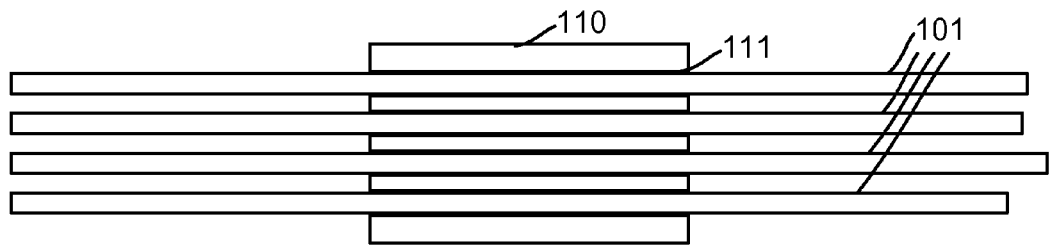

The present invention relates to photonics techniques. More particularly, the present invention provides methods and structures for attaching multiple optical fibers through a fiber block with separate or combined lid member to silicon photonics.

In the last decades, with advent of cloud computing and data center, the needs for high data rate communication networks have evolved. Low loss, high data rate capabilities, noise rejection and electrical isolation are just a few of the important features that make fiber optic technology ideal for the transport of information in communication networks. In the network nodes, the routing and signal processing is performed electrically, and the electrical signal is converted back into light and sent on the output fiber and transport it towards the next node. These opto-electronic conversions cause an increase of the latency of the whole transport network, and the benefits of high velocity capability of using optical fibers is unfortunately wasted. The most efficient way for making the most of optical fiber advantages is to replace microelectronic circuitry with optical circuits capable for all-optical signal processing. For enabling higher speeds up to terabit per second that support optical fiber, it is important that the signal remains in the photonic domain throughout its path.

The leading motivation in favor of silicon photonic technology is that it aims to achieve a compact convergence between photonics and electronics. The directions are to use silicon, which has been the base material for electronic circuits, to replace the various non-silicon materials currently used to form optical devices and to integrate ultra small silicon waveguide circuits and silicon electronic circuits on the same chip. The use of silicon lets us utilize the advanced planar mass-production facilities that have enabled the low-cost production of electronic circuits based on mature silicon complementary metal-oxide semiconductor (CMOS) microelectronic manufacturing. Therefore, it is expected to provide an economical benefit by achieving advanced functionality in optical devices that support the network at a lower cost. Moreover, the possibility for getting high-quality and cheap Silicon-on-Insulator (SOI) wafers for forming the silicon waveguides on chip makes the motivation more attractive. However, the coupling of a standard single mode optical fiber with larger size core to a silicon waveguide with much narrower width posed problems of low coupling efficiency, loss of power, and difficulty in keeping the alignment, etc. Recent technology progress may improve the situation for single fiber coupling to the silicon chip, while still face many challenges when handing a bunch of fibers together because of troubles during manufacture for keeping each fiber properly aligned at the same time after attaching each of them to the silicon waveguide chip. Thus, improving the way of attaching a fiber block to the silicon waveguide chip described in the following specification becomes a main objective of the present invention.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified top view of an array of fibers disposed on a holder base according to an embodiment of the present invention. This diagram is merely an example, which should not unduly limit the scope of the claims. One of ordinary skill in the art would recognize many variations, alternatives, and modifications. As shown, a portion of an array of multiple (e.g., four) optical fibers 101 of arbitrary length are disposed partially into respective linear slots 111 pre-fabricated in parallel in a holder base 110 of a certain length. The holder base 110 is preferred to be made by glass or other materials (e.g., silicon oxide, quartz) having similar thermal properties as fiber glass. Each optical fiber can be a standard single-mode fiber, or a multiple-mode fiber, or a polarization-maintaining fiber, depending on applications. FIG. 1 also demonstrates a process step of a method for forming a fiber block to silicon chip attachment structure. After this step, each o the array of optical fibers 101 of arbitrary length has a portion being disposed onto the holder base 110, leaving two extended sections with arbitrary but sufficient long length free beyond both edges (left-right in FIG. 1) of the holder base 110.

Figure 2:
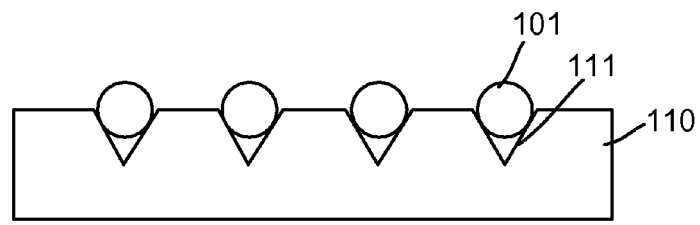
FIG. 2 is a simplified side view of FIG. 1 showing the array of fibers in respective V-grooves of the holder base according to the embodiment of the present invention.

FIG. 2 is a simplified side view of FIG. 1 showing each of the array of fibers in a linear V-groove of the holder base according to the embodiment of the present invention. In particular, the linear slots 111 in the holder base 110 are linear V-grooves formed therein and each V-groove is configured to partially hold a portion (of the length of the holder base) of one optical fiber 101 with fiber body being disposed roughly halfway in. This is a structure that facilitates easy access for performing fiber alignment adjustment as well as for proper fixation of the whole fiber body in a later process at its location. In a specific embodiment, all (four in the FIG. 2 as an example) optical fibers 101, especially for those polarization maintaining fibers, can be properly aligned relative to each other when each fiber is disposed in position before fixing onto the holder base 110. Although a tooling for alignment adjustment of each individual fiber is readily available, it is an advantage of the current method for having all these fibers conveniently aligned in corresponding V-grooves before being fixed therein and ready for forming a fiber block with array of well-aligned fibers.

Figure 3:
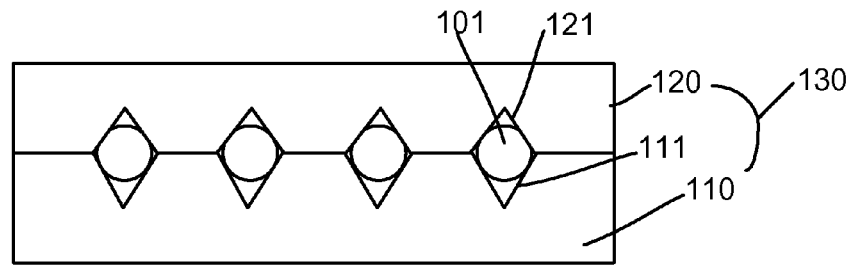
FIG. 3 is a simplified side view of a fiber block with a holder cap being added onto the holder base for fixing the array of fibers in FIG. 2 according to the embodiment of the present invention.

FIG. 3 is a simplified side view of a fiber block with a holder cap being added onto the holder base for fixing the array of fibers in FIG. 2 according to the embodiment of the present invention. This diagram is merely an example, which should not unduly limit the scope of the claims. One of ordinary skill in the art would recognize many variations, alternatives, and modifications. As shown, a holder cap 120 including corresponding linear slots 121 is engaged with the holder base 110 to allow the linear slots 121 to secure the fibers 101 partially disposed in the slots 111 of the holder base 110 after necessary fiber alignment adjustments. In an embodiment, the holder cap 120 is made by a same material as the holder base 110 and the slot 121 is properly pre-fabricated in predetermined position to align with the corresponding slot 111 in the holder base 110. In a specific embodiment, the slot 121 is also a linear V-groove opposing to the linear V-groove 111 so that a round shaped optical fiber 101 can be perfectly disposed in between. Further, rest planar regions of the holder cap 120 and the holder base 110 are glued or weld together with any gaps in between or around the fiber body can be filled with a fill material by infusion. The holder cap 120 combining the holder base 110 forms a fiber block holder 130. Alternatively, FIG. 3 also demonstrates another process step of the method for forming a fiber-block-to-silicon-chip attachment structure, in which a fiber block holder 130 fixes a finite portion of the array of optical fibers of arbitrary length in proper alignment while leaving sufficient length for the array of optical fibers 101 beyond both sides of the fiber block holder 130.

Figure 4:
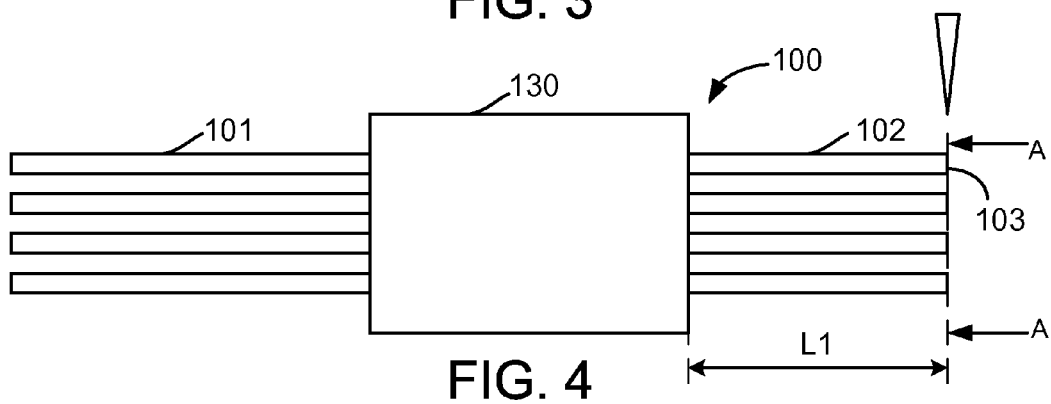
FIG. 4 is a simplified top view of the fiber block with all fibers being cut along line A-A according to an embodiment of the present invention.

FIG. 4 is a simplified top view of the fiber block with all fibers being cut along line A-A according to an embodiment of the present invention. This diagram is merely an example, which should not unduly limit the scope of the claims. One of ordinary skill in the art would recognize many variations, alternatives, and modifications. As shown, the fiber block 100 is formed with array of optical fibers 101 of arbitrary length being fixed in a finite portion by a fiber block holder 130 and having all fibers 102 beyond a predetermined length L1 on one side of the fiber block holder 130 being cut but leaving substantially long length for all fibers 101 on another side. The fiber cutting is done along a line A-A (as shown in FIG. 4) perpendicular to the array of optical fibers 102 extended in parallel from those fixed by the fiber block holder 130. In a specific embodiment, laser cutting or high precision mechanical cutting is done so that the length variation of L1 can be limited within a few microns or smaller. In another specific embodiment, FIG. 4 also illustrates a process step of the method for forming a fiber-block-to-silicon-chip attachment structure. In particular, this process step ends up with the formation of a fiber block 100 having an array of optical fibers 102 being cut to substantially the same length L1 each with an ending fiber facet 103 ready for making the attachment with a waveguide chip.

Figure 5:
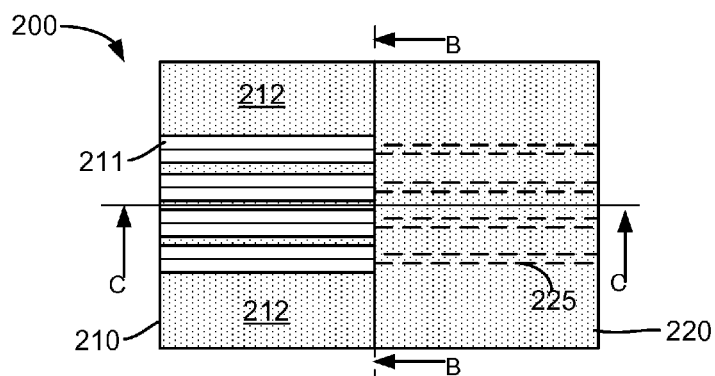
FIG. 5 is a simplified top view of a silicon photonics waveguide chip with fiber attachment structure according to an embodiment of the present invention.

FIG. 5 is a simplified top view of a silicon photonics waveguide chip with fiber attachment structure according to an embodiment of the present invention. This diagram is merely an example, which should not unduly limit the scope of the claims. One of ordinary skill in the art would recognize many variations, alternatives, and modifications. As shown schematically, a waveguide chip 200 is a silicon photonics chip formed on a SOI substrate including a fiber attachment section 210 next to a (partial) waveguide section 220 in a top view. The fiber attachment section 210 has a length of L2 preset to be slightly smaller than the length L1 of fiber section 102 of the fiber block 100. Additionally, the fiber attachment section 210 includes multiple slots 211 engraved in parallel in a planar region 212 (see the top view of FIG. 5) with each slot being designated for holding at a fiber section 102 least partially. The waveguide section 220 includes multiple silicon based waveguides 225 pre-fabricated via CMOS technology. In an embodiment, each waveguide 225 is embedded inside the waveguide section 220 and having its end plane aligned with an end plane of corresponding one of the multiple slots 211 in the attachment section 210.

Figure 5A:
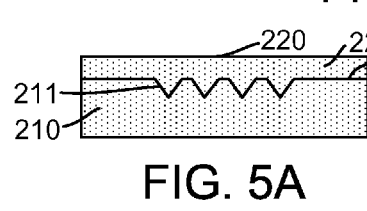
FIG. 5A is a cross-section view along line B-B of FIG. 5 according to the embodiment of the present invention.
Figure 5B:
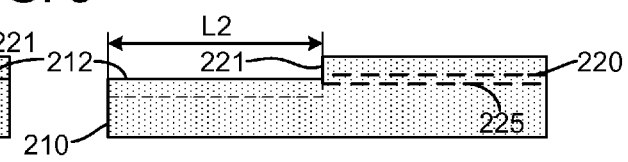
FIG. 5B is a cross-section view along line C-C of FIG. 5 according to the embodiment of the present invention.

FIG. 5A is a cross-section view along line B-B of FIG. 5 and FIG. 5B is a cross-section view along line C-C of FIG. 5 according to the embodiment of the present invention. As shown, the waveguide section 220 includes a thickness larger than that of the fiber attachment section 210 so that an vertical plane section 221 of the waveguide section 220 is formed along line B-B, which is configured to align each silicon waveguide 225 inside with an ending facet 103 of each optical fiber (e.g., one of the array of optical fibers 102 from a fiber block 100). FIG. 5A shows that each slot 211, in a specific embodiment, is a V-groove similar to the V-groove 111 in the holder base 110. FIG. 5B shows that the waveguide section 220 has a larger thickness than the attachment section 210 so that the vertical plane section 221 is above the planar region 212. Each of these V-grooves 211 is configured to align with one silicon waveguide 225 embedded inside the waveguide section 220.

In an another embodiment, FIGS. 5, 5A, and 5B are illustrating another process step of the method for forming a fiber block to silicon chip attachment structure, in which a silicon photonics waveguide chip is prepared with a fiber attachment section for coupling with array of fibers in a fiber block. In particular, the fiber attachment section 210 includes corresponding slots 211 in a planar region 212 that has length L2 smaller than the length L1 of the fibers 102 on one side of the fiber block holder 130.

Figure 6:
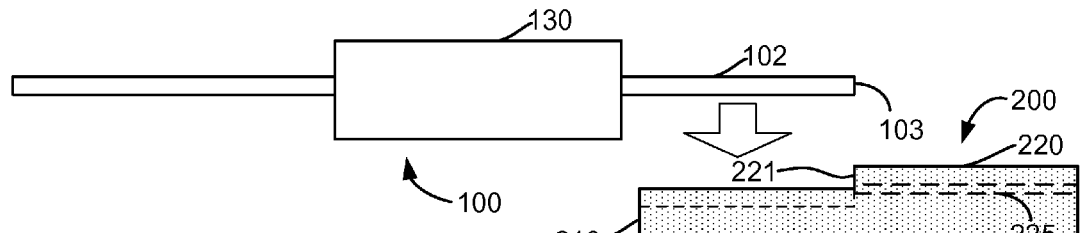
FIG. 6 is a simplified side view of a fiber block being attached with a silicon photonics waveguide chip according to an embodiment of the present invention.

FIG. 6 is a simplified side view of a fiber block being attached with a silicon photonics waveguide chip according to an embodiment of the present invention. This diagram is merely an example, which should not unduly limit the scope of the claims. One of ordinary skill in the art would recognize many variations, alternatives, and modifications. As shown, the fiber block 100 is engaged with the silicon photonics waveguide chip 200 to have array of fibers 102 of length L1 on one side of the fiber block holder 130 partially attached with the attachment section 210 of length L2. With the above engagement, the ending facet 103 of each fiber 102 is aiming to be in contact with the vertical plane section 221 to align with one waveguide 225 laid in the waveguide section 220. This is another process step of the method for forming a fiber-block-to-silicon-chip attachment structure.

Figure 7:
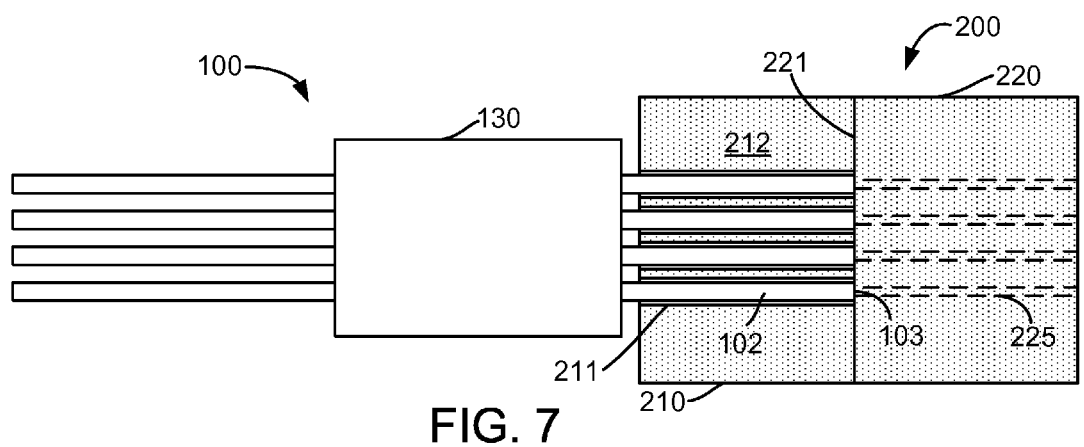
FIG. 7 is a simplified top view of a fiber block being attached with a silicon photonics waveguide chip according to the embodiment of the present invention.

FIG. 7 is a simplified top view of a fiber block being attached with a silicon photonics waveguide chip according to the embodiment of the present invention. This diagram is merely an example, which should not unduly limit the scope of the claims. One of ordinary skill in the art would recognize many variations, alternatives, and modifications. As shown, this diagram shows just a result of the previous step (shown in FIG. 6) for forming the fiber-block-to-silicon-chip attachment structure with the fibers 102 of the fiber block 100 being partially attached into the slots 211 in the planar region 212 of the attachment section 210 of the silicon photonics waveguide chip 200. The fibers 102 in length L1 is configured to have its partial length fitting into the respective slots 211 in the planar region 212 so that the ending facet 103 of each fiber in touch with the vertical plane section 221 to couple with the corresponding waveguide 225 in the waveguide section 220. In an embodiment, the waveguide 225 inside the waveguide section 220 has be pre-fabricated to have its starting section at the vertical plane section 221 aligning with a potential core position of the ending facet 103 of a fiber 102 once it is disposed into the corresponding slot 211. Note, the width of the waveguide 225 is not in actual scale but is just enlarged for illustration purpose.

Figure 8:
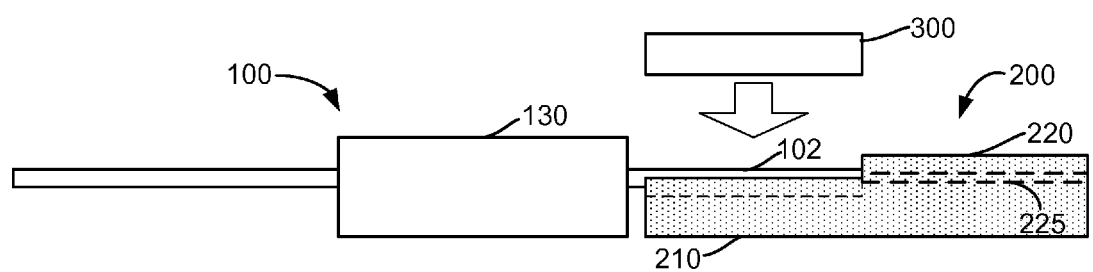
FIG. 8 is a simplified side view of a lid member being added over the array of fibers on the attachment structure of the silicon photonics waveguide chip according to an embodiment of the present invention.

FIG. 8 is a simplified side view of a lid member being added over the array of fibers on the attachment structure of the silicon photonics waveguide chip according to an embodiment of the present invention. This diagram is merely an example, which should not unduly limit the scope of the claims. One of ordinary skill in the art would recognize many variations, alternatives, and modifications. As shown, an additional step of forming the fiber-block-to-silicon chip attachment structure is shown to place a lid member 300 over the array of fibers 102 that have been disposed in the attachment section 210 of the silicon photonics waveguide chip 200. The lid member 300 is designed to secure the disposed fibers 102 in the attachment section 210.

Figure 9:
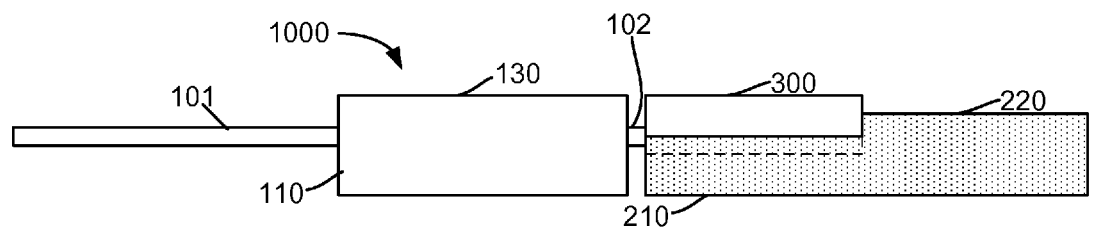
FIG. 9 is a simplified side view of a fiber block attachment structure to the silicon photonics waveguide chip according to an embodiment of the present invention.

FIG. 9 is a simplified side view of a fiber block attachment structure to the silicon photonics waveguide chip according to an embodiment of the present invention. This diagram is merely an example, which should not unduly limit the scope of the claims. As shown, this diagram shows a result of the previous step, i.e., forming a fiber-block-to-silicon-chip attachment structure 1000 by engaging a section of multiple fibers 102 out of one side of a fiber block holder 130 directly with an attachment section 210 to couple respectively to multiple waveguides in the waveguide section 220. As seen from FIG. 1 trough FIG. 8, fiber-block-to-silicon-chip attachment structure 1000 includes a fiber block holder 130 for holding array of optical fibers leaving arbitrary lengths on one side a predetermined length L1 on other side to be disposed partially into the attachment section 210 of a length L2. Each of the multiple fibers 102 is pre-aligned before being fixed by the fiber block holder 130. Then each section of the multiple fibers 120 is disposed partially into corresponding slots pre-fabricated in the attachment section 210 before the lid member 300 is placed. Once the lid member 300 is placed, filling material can be applied by infusion to fill any gaps between the lid member 300 and the attachment section 210. In an embodiment, the lid member 300 can be a glass material or other dielectric material having comparable properties with that of the attachment section 210. In another embodiment, the lid member may not include any V-grooves but merely for pressing over the fibers 102 for securing the attachment structure 1000. Of course, one of ordinary skill in the art would recognize many variations, alternatives, and modifications.

Figure 10:
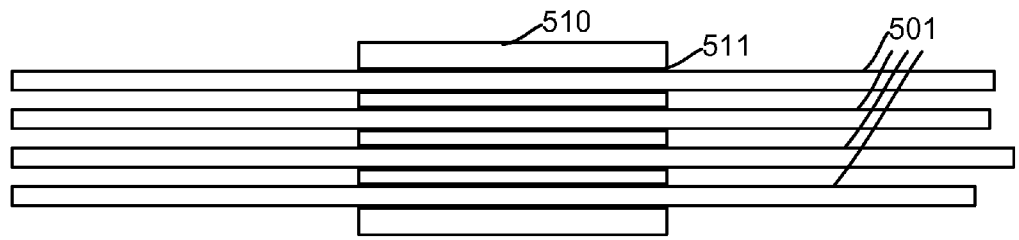
FIG. 10 is a simplified top view of an array of fibers disposed on a holder base according to another embodiment of the present invention.
Figure 11:
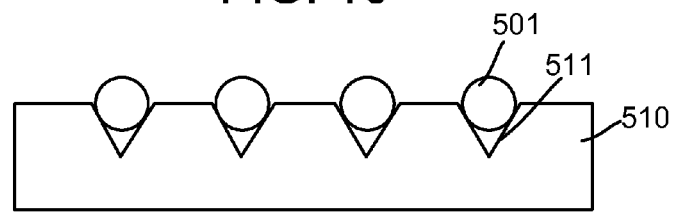
FIG. 11 is a simplified side view of FIG. 10 showing the array of fibers in respective V-grooves of the holder base according to the embodiment of the present invention.

In an alternative embodiment, FIGS. 10-18 are schematic diagrams illustrating a method for forming a fiber-block-to-silicon-chip attachment device. In this embodiment, the fiber block is formed differently. FIG. 10 is a simplified top view of an array of fibers disposed on a holder base according to another embodiment of the present invention. What FIG. 10 illustrates is substantially the same as FIG. 1 as a process step for using a holder base 510 made by glass material configured with multiple parallel slots 511 to hold a finite portion of an array of optical fibers 501 of arbitrary length in parallel and make them properly aligned optically in respective slots. FIG. 11, substantially similar to FIG. 2, additionally shows a side view of the array of fibers 501 disposed partially in respective parallel slots or V-grooves 511 of the holder base 510 according to the embodiment of the present invention. Although no specific fiber core feature is shown, these fibers need to be adjusted in rotational position for ensuring uniform alignment among the fibers and maximizing the fiber-to-waveguide coupling efficiency.

Figure 12:
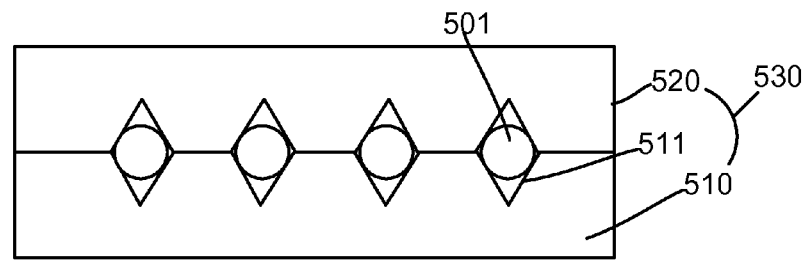
FIG. 12 is a simplified side view of a structure with a holder cap being added onto the holder base for fixing the array of fibers in FIG. 10 according to the embodiment of the present invention.

FIG. 12 is a simplified side view of a structure with a holder cap being added onto the holder base for fixing the array of fibers in FIG. 10 according to the embodiment of the present invention. This diagram is merely an example, which should not unduly limit the scope of the claims. As shown, after each fiber is optically aligned, a holder cap 520 is disposed from top to fix the finite portion of the array of fibers previously disposed in the V-grooves 511 of the holder base 510 at bottom. Combining the holder cap 520 and the holder base 510, a fiber holder 530 is formed to secure the array of fibers 501.

Figure 13:
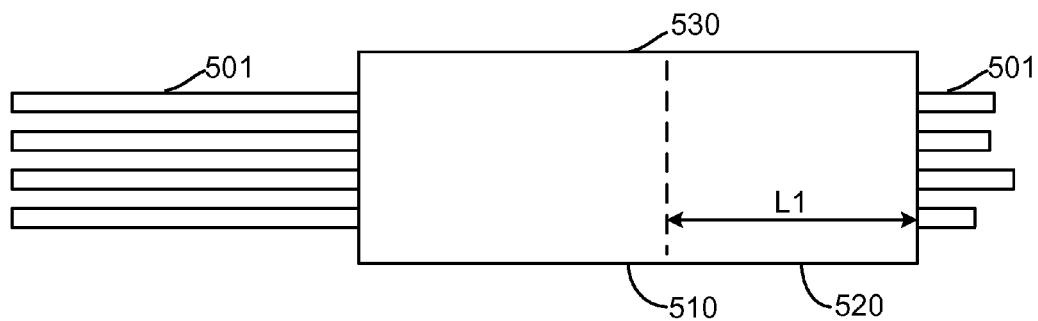
FIG. 13 is a simplified top view of the structure with the array of fibers being fixed between the holder cap and the holder base according to the embodiment of the present invention.
Figure 14:
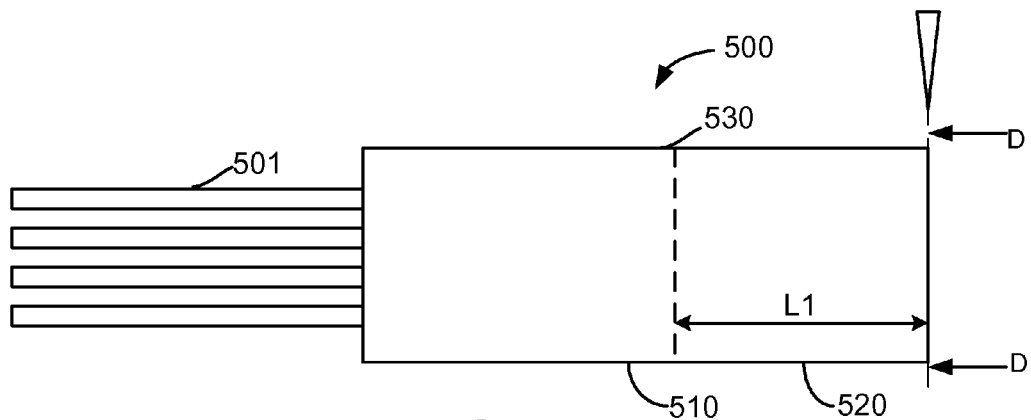
FIG. 14 is a simplified top view of a fiber block structure in FIG. 13 with all fibers being cut along line D-D at an edge of the holder cap according to the embodiment of the present invention.

In a specific embodiment, FIG. 13 shows a top view of the structure in FIG. 12, indicating the holder cap 520 (currently visible) is longer than the holder base 510 (blocked by holder cap 520) by a length L1. This structure is further clearly illustrated in a side view shown in FIG. 15 below. The array of fibers 501 is left free on either side of the fiber holder 530 have arbitrary yet sufficient long lengths although on one side (right side in FIG. 13) they may be intentionally much shorter beyond an edge of the fiber holder 530 (or particularly, beyond the edge of the holder cap 520). In a subsequent process step, the array of fibers 501 beyond the edge of the holder cap 520 are cut along the holder cap edge line D-D that is substantially perpendicular to the array of fibers 501 fixed in parallel by the fiber holder 530, as seen in FIG. 14, to form a prepared fiber block 500. In a specific embodiment, laser cutting or high precision mechanical cutting is done so that the length variation of L1 can be limited within 1 micron or smaller. The fibers 501 on the other side of the fiber holder 530 within this fiber block 500 are still freely extended.

Figure 15:
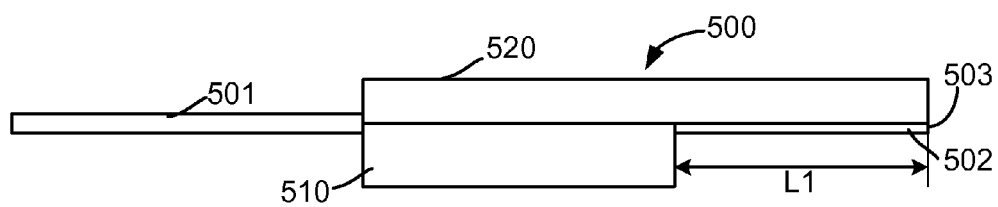
FIG. 15 is a simplified side view of the fiber block structure of FIG. 14 according to the embodiment of the present invention.

FIG. 15 is a simplified side view of the fiber block of FIG. 14 according to the embodiment of the present invention. As shown, the fiber block including a fiber holder 530 made by the holder cap 520 and the holder base 510, holding array of fibers 501 with extended lengths on one side of the fiber holder 530 (or holder base 510) but without extra length beyond the edge of the holder cap 520 on the opposing side. The fiber cap 520 is longer than the holder base 510 by the length L1. The fibers 502 are remaining sections of fibers 501 (on the other side of the holder base 510) that are still attached to the holder cap 520 after cutting along the line D-D (see FIG. 14) to remove any extra length beyond the edge of the holder cap 520. One result of the cutting process shown in FIG. 14 is formation of an ending facet 503 of each fiber section 502. Each ending facet 503 of the fiber section 502 is leveled with the edge plane of the holder cap 520 and is designated to have corresponding fiber cores be coupled with a silicon waveguide.

Figure 16:
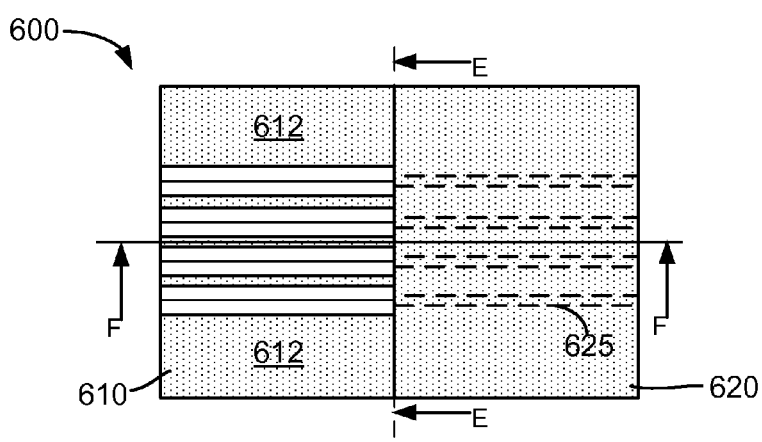
FIG. 16 is a simplified top view of a silicon photonics waveguide chip with fiber attachment structure according to an embodiment of the present invention.
Figures 16A, 16B:
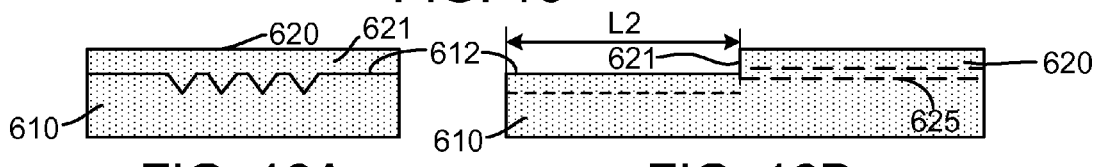
FIG. 16A is a cross-section view along line E-E of FIG. 16 according to the embodiment of the present invention.
FIG. 16B is a cross-section view along line F-F of FIG. 16 according to the embodiment of the present invention.

In an alternative embodiment, FIGS. 16, 16A, and 16B are schematic diagrams showing an exemplary silicon photonics waveguide chip configured with an attachment section connected to a waveguide section, substantially the same as those diagrams of FIGS. 5, 5A, and 5B. FIG. 16A is a cross-section view along line E-E of FIG. 16 and FIG. 16B is a cross-section view along line F-F of FIG. 16 according to the embodiment of the present invention. All corresponding features, such as the fiber attachment section 610 of a length L2 containing multiple slots 611 on its planar region 612 and the waveguide section 620 having pre-fabricated multiple waveguides 625 aligned to the corresponding multiple slots 611 at an end plane 621, of the silicon photonics waveguide chip 600 can be referred to the waveguide chip 200 shown in FIGS. 5, 5A, and 5B without need for further detail description.

Figure 17:
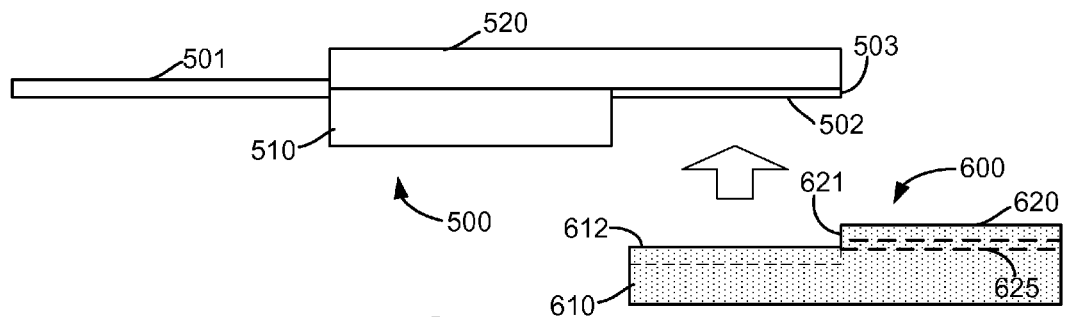
FIG. 17 is a simplified side view of the fiber block of FIG. 15 being engaged with the silicon photonics waveguide chip of FIG. 16 according to an alternative embodiment of the present invention.

FIG. 17 is a simplified side view of the fiber block of FIG. 15 being engaged with the silicon photonics waveguide chip of FIG. 16 according to an alternative embodiment of the present invention. As shown in this embodiment, it demonstrates a process step to have the planar region 612 of the attachment section 610 of the silicon photonics waveguide chip 600 moved to engage with the fibers 502 fixed partially in the holder cap 520 of the fiber block 500. The fiber attachment section 610 comprises multiple slots 611 in length L2 configured to just match at least partially with those fiber sections 502 in length L1, where L2 is smaller than L1.

Figure 18:
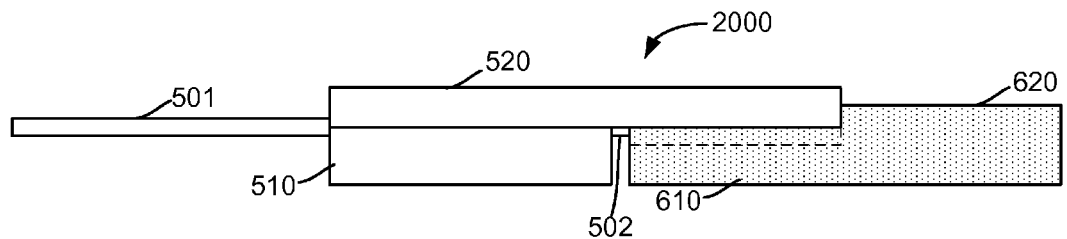
FIG. 18 is a simplified side view of a fiber block attachment structure to the silicon photonics waveguide chip according to an alternative embodiment of the present invention.

FIG. 18 is a simplified side view of a fiber block attachment structure to the silicon photonics waveguide chip according to an alternative embodiment of the present invention. In an embodiment, this diagram shows a formation of a fiber-block-to-silicon-chip attachment device 2000 by engaging the fiber block 500 with the silicon photonics waveguide chip 600. In particular, this device 2000 is formed via a desired engagement between the fibers 502 and the respective slots 611 is to have the ending facet 503 to contact with the end plane 621 where each fiber core of the fibers 502 is to couple with one corresponding waveguide 625 in the waveguide section 620 with pre-configured alignment for uniform coupling settings among all fibers and optimized optical coupling between the fiber and silicon-based waveguide. After the engagement, proper fixing techniques can be applied including gluing, bonding, filling infusion, welding, and curing, or others. Since each fiber 501 ended with corresponding section 502 has been aligned during the formation of the fiber block 500, the final engagement process will not affect the final optical alignment among all fibers so that the manufacture process becomes substantially simplified when attaching array of fibers to a silicon chip.

Figure 19:
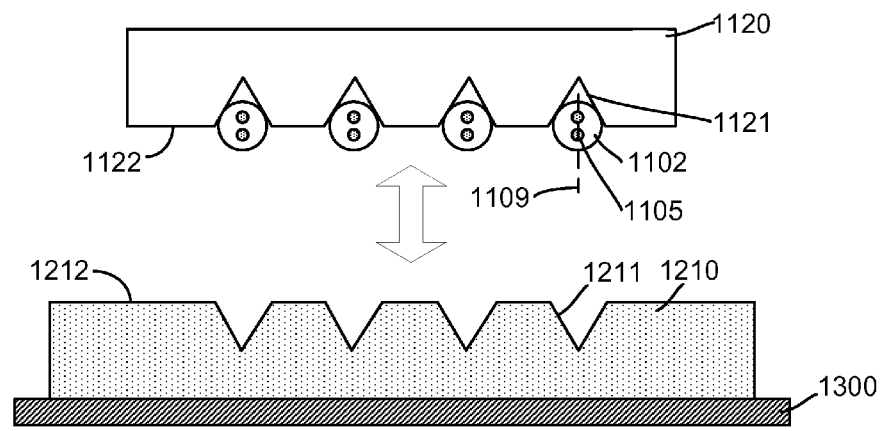
FIG. 19 is a simplified cross-section view of a fiber block with all-aligned fibers in respective V-grooves to be attached with the silicon photonics waveguide chip according to another embodiment of the present invention.

FIG. 19 is a simplified cross-section view of a fiber block with all-aligned fibers in respective V-grooves to be attached with the silicon photonics waveguide chip according to another embodiment of the present invention. This diagram is merely an example, which should not unduly limit the scope of the claims. One of ordinary skill in the art would recognize many variations, alternatives, and modifications. As an example of forming the fiber-block-to-silicon-chip attachment structure 1000 or the fiber-block-to-silicon-chip attachment device 2000, all fibers held by the fiber block can be pre-aligned before fixing in the fiber block. In the example, each fiber 1102 is partially disposed at a slot 1121 of a fiber holder 1120, where each fiber is free to rotate without shift to ensure the fiber cores 1105 of each fiber 1102 is properly aligned to a desired or predetermined direction. In a specific case, the fiber 1102 is a polarization-maintaining fiber so that two small rounded fiber cores exist in each fiber aligned at a specific direction 1109 along a line connected by two centers of the two rounded fiber cores.

Depending on application, the alignment adjustment may need to ensure the direction 1109 is aligned to a common line perpendicular to the contact plane 1122 of the fiber holder 1120, or a common line along other direction, for every fiber

1102 to be fixed with the fiber holder 1120. Since the fiber holder 1120 is a very simple structure, the process for performing the alignment among all the individual fiber 1102 can be done quickly. Once all the fibers 1102 are aligned in a desired state, they can be fixed with the fiber holder 1120 to avoid future alignment variation to form a fiber block. Then, the fiber block as a whole can be directly attached with the silicon waveguide chip. In particular, the contact plane 1122 will be engaged with a planar region 1212 of an attachment section 1210 of the silicon waveguide chip mounted on a PCB 1300. The planar region 1212 contains multiple slots 1211 that are designated to accept the respective fibers 1102 partially fixed with the fiber holder 1120 when the planar region is in contact with the contact plane 1122. An interface region between the contact plane 1122 and the planar region 1212 can be glued or welded depending on material used or application without worry about the alignment issue among the fibers in this attachment structure, wherein each fiber is also in position to align with corresponding waveguide connected to the attachment section 1210. A filling process may be needed to fill any gap in the interface region or around the fibers 1102 by infusion.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An apparatus to attach a fiber block to a silicon photonics waveguide chip comprising:
    a planar array of polarization-maintaining optical fibers of arbitrary length;
    a holder base of a first length including multiple slots in parallel respectively holding partially a portion of the planar array of polarization-maintaining optical fibers, each fiber having two cores being aligned optically within corresponding slot in a direction perpendicular to the planar array;
    a holder cap of the first length configured to combine with the holder base for fixing the portion of the planar array of polarization-maintaining optical fibers and leaving arbitrary length of the planar array of polarization-maintaining optical fibers free beyond a first edge of the holder base but keeping only additional second length of the planar array of polarization-maintaining optical fibers free beyond a second edge of the holder base with all fiber ending facets substantially level at the second length, the second edge opposing to the first edge;
    a silicon photonics waveguide chip including an attachment section connected to a waveguide section, the attachment section including multiple grooves of a third length in parallel respectively aligned to multiple waveguides formed in parallel in the waveguide section, the multiple grooves being configured to respectively hold partially the second length of the planar array of polarization-maintaining optical fibers with each fiber ending facet being coupled to corresponding one of the multiple waveguides; and
    a lid member disposed over the attachment section to cover and fix at least partially the second length of planar array of polarization-maintaining optical fibers held in the multiple grooves.

2. The apparatus of claim 1 wherein the holder base and the holder cap are made of glass material of substantially same length equal to the first length.

3. The apparatus of claim 1 wherein each of the multiple slots is a linear V-groove of the first length.

4. The apparatus of claim 1 wherein the planar array of polarization-maintaining optical fibers comprises substantially more than two fibers.

5. The apparatus of claim 1 wherein the holder cap comprises multiple V-grooves opposing to the multiple slots in the holder base for fixing the first length of planar array of polarization-maintaining optical fibers in between with any gap around each fiber being filled by infusion.

6. The apparatus of claim 1 wherein the second length of the planar array of polarization-maintaining optical fibers beyond the edge of the holder base comprises substantially an equal length with less than a few microns in variation when the planar array of polarization-maintaining optical fibers beyond the second edge of the holder base are subjected to a laser cutting at a mark of the second length measured from the second edge of the holder cap.

7. The apparatus of claim 1 wherein the silicon photonics waveguide chip is fabricated based on substantially silicon material in a silicon-on-insulator (SOI) substrate.

8. The apparatus of claim 1 wherein the third length of the attachment section is smaller than the second length so that a full length of each of the multiple grooves is used for attaching just a partial portion of the second length of one of the planar array of polarization-maintaining optical fibers.

9. The apparatus of claim 1 wherein the waveguide section comprises an end plane at which each of the multiple waveguides ends to join with an end section of corresponding one of the multiple grooves.

10. The apparatus of claim 9 wherein the end plane is substantially perpendicular to the multiple grooves and the multiple waveguides in parallel.

11. The apparatus of claim 1 wherein the multiple grooves are formed in an exposed planar region of the attachment section for facilitating attachment of the second length of planar array of polarization-maintaining optical fibers.

12. The apparatus of claim 1 wherein the multiple waveguides are embedded inside the waveguide section via CMOS technology.

13. A structure for attaching a fiber block to a silicon photonics waveguide chip comprising:
    a holder base of a first length including multiple slots in parallel respectively for holding partially a finite portion of a planar array of polarization-maintaining optical fibers of arbitrary length, each of the planar array of polarization-maintaining optical fibers having two cores being aligned optically within corresponding slot in a direction perpendicular to the planar array;
    a holder cap including a first part of the first length combined with the holder base for fixing the finite portion of the planar array of polarization-maintaining optical fibers and a second part of a second length naturally extended from the first part for partially holding additional second length of the planar array of polarization-maintaining optical fibers with corresponding fiber ending facets being leveled with an edge of the second part of the holder cap, the planar array of polarization-maintaining optical fibers of arbitrary length being left free beyond opposite edge of the holder cap; and
    a silicon photonics waveguide chip including an attachment section connected to a waveguide section, the attachment section of a third length including multiple grooves in parallel respectively aligning to multiple waveguides formed in the waveguide section, the attachment section being configured to contact the second part of the holder cap so as to engage the multiple grooves respectively with the second length of the planar array of polarization-maintaining optical fibers partially held in the second part with each the fiber ending facet being coupled to one of the multiple waveguides.

14. The structure of claim 13 wherein the holder cap and the holder base comprises substantially a same material selected from glass, silicon oxide, and quartz.

15. The structure of claim 13 wherein the holder cap comprises multiple V-grooves configured to be respectively opposed to the multiple slots for fully fixing the finite portion of the array of optical fibers in between and further holding the additional second length of the array of optical fibers at least partially.

16. The structure of claim 13 wherein the planar array of polarization-maintaining optical fibers comprises substantially more than two fibers.

17. The structure of claim 13 wherein the silicon photonics waveguide chip is fabricated based on substantially silicon material in a silicon-on-insulator (SOI) substrate.

18. The structure of claim 13 wherein the multiple waveguides are embedded inside the waveguide section via CMOS technology.

19. The structure of claim 13 wherein the third length of the attachment section is smaller than the second length so that a full length of each of the multiple grooves is used for engaging with just a partial portion of the second length of one of the planar array of polarization-maintaining optical fibers partially held in the second part of the holder cap.

20. The structure of claim 13 wherein the waveguide section comprises an end plane at which each of the multiple waveguides ends to join with an end section of corresponding one of the multiple grooves.

21. The structure of claim 20 wherein the end plane is substantially perpendicular to the multiple grooves in parallel and the multiple waveguides in parallel.

22. A method for attaching a fiber block to a silicon waveguide chip comprising:
disposing a finite portion of a planar array of polarization-maintaining optical fibers of arbitrary length respectively into multiple slots laid in parallel in a holder base member;
aligning two fiber cores orientation of each of the planar array of polarization-maintaining optical fibers to a common direction perpendicular to the array;
disposing a holder cap member comprising multiple opposing slots in parallel to engage with the holder base member for fixing the finite portion of the planar array of polarization-maintaining optical fiber between the multiple slots and the multiple opposing slots;
keeping the planar array of polarization-maintaining optical fibers of arbitrary length free on a first side of the holder base member while cutting the planar array of polarization-maintaining optical fibers to just a first length on a second side of the holder base member opposing to the first side with all fiber ending facets being substantially level at the first length;
forming a silicon photonics waveguide chip configured to be at least an attachment section connected to a waveguide section, the attachment section comprising multiple grooves with substantially equal second length laid in parallel in a planar region, the waveguide section comprising multiple waveguides in parallel embedded therein having respective end regions sharing a common perpendicular end plane with the multiple grooves, the second length being smaller than the first length; and
attaching a portion of the first length of the planar array of polarization-maintaining optical fibers on the second side of the holder base member to the full second length of the multiple grooves in the planar region of the attachment section so that each fiber ending facet is coupled to the end region of one of the multiple waveguides.

23. The method of claim 22 wherein the first length of the array of optical fibers are also respectively held by the multiple opposing slots partially before attaching to the multiple grooves.

24. The method of claim 22 wherein the silicon photonics waveguide chip is fabricated based on substantially silicon material in a silicon-on-insulator (SOI) substrate.

25. The method of claim 22 further comprising placing a lid member at least partially over and fixing the first length of the planar array of polarization-maintaining optical fibers attached into the multiple grooves of the second length.

* * * * *